Patented Jan. 4, 1949

2,458,450

UNITED STATES PATENT OFFICE 2,458,450

DECOLORIZATION OF ESTERS OF ACRYLIC AND α-ALKYL-ACRYLIC ACIDS

William P. Utermohlen, Jr., Charlottesville, Va., assignor to Eastman Kodak Company, Rochester, N. Y., a corporation of New Jersey No Drawing. Original application January 7, 1943, Serial No. 471,607. Divided and this application November 2, 1945, Serial No. 626,427

4 Claims. (Cl. 260—486)

This invention relates to the decolorization of acrylic and α-alkylacrylic acids and their derivatives. This application is a division of my copending application Serial No. 471,607, filed January 7, 1943, now Patent No. 2,394,572.

In the preparation of acrylic and α-alkylacrylic acids by oxidation of acrolein and α-alkyl acroleins, an undesirable color frequently develops in the acids, owing to the fact that phenolic polymerization inhibitors, e. g. hydroquinone, have been used to preserve the acrolein or α-alkyl acrolein. Moreover, acrylic acid and α-alkylacrylic acids which have been stored containing a phenolic polymerization inhibitor frequently develop undesirable color. This color persists even in monomeric compounds, e. g. esters, prepared from the colored acids. The color also persists in polymerization products prepared from the colored acids or their derivatives. The color is caused by oxidation products of the phenolic polymerization inhibitors, I have found.

It is, accordingly, an object of my invention to provide a process for decolorizing the aforesaid colored acids and monomeric products prepared from the acids. Other objects will become apparent hereinafter.

In accordance with the invention, I decolorize colored monomeric compounds selected from the group consisting of acrylic acid, α-alkylacrylic acids and monomeric compounds prepared from the colored acrylic acid and α-alkylacrylic acids, such as esters of these acids, the color of said colored monomeric compounds being caused by the presence of colored oxidation products of phenolic polymerization inhibitors, by treating the colored monomeric compounds with an alkali metal bisulfite. The monomeric acids are advantageously dissolved in a water immiscible solvent and the resulting solution washed with an aqueous solution of an alkali metal bisulfite to effect the decolorization. As suitable water immiscible solvents, diethyl ether, a mixture of diethyl ether and methylene chloride, and benzene are exemplary. With water immiscible derivatives of the colored acids, the derivatives can advantageously be treated directly with an aqueous solution of the alkali metal bisulfite.

The following examples will serve to illustrate the manner of practicing my invention:

Example 1

α-Methacrylic acid which had been prepared by the oxidation of α-methacrolein which contained hydroquinone as a polymerization inhibitor turned to a deep wine color upon prolonged standing. This colored material was diluted with diethyl ether and the ethereal solution was washed with a small quantity of a 20 per cent aqueous solution of sodium bisulfite. The resulting ethereal solution became practically colorless. The colorless ethereal solution was dried over anhydrous sodium sulfite, the ether removed and the colorless α-methacrylic acid recovered by distillation in vacuo in a colorless form.

Example 2

Freshly prepared α-ethacrylic acid, possessing a yellow color due to the presence of oxidation products (p-benzoquinone which arose from oxidation of hydroquinone which had been incorporated in the acid as a polymerization inhibitor), was dissolved in benzene. The benzene solution was washed with a small quantity of a 20 per cent aqueous solution of sodium bisulfite. This treatment removed practically all of the color. The benzene solution was dried over anhydrous sodium sulfate, the benzene removed and the α-ethacrylic acid recovered by distillation in vacuo. Resinous polymers prepared from this color-free α-ethacrylic acid remained colorless.

Example 3

Isobutyl α-ethacrylate, prepared by esterification of α-ethacrylic acid with isobutyl alcohol (see the copending application of R. L. Hasche and W. P. Utermohlen, Jr., Serial No. 471,608, filed January 7, 1943, now United States Patent 2,388,844, dated November 13, 1945) which was yellow due to the presence of oxidation products of hydroquinone which have been employed in the α-ethacrylic acid, was washed with a cold, dilute solution of potassium carbonate and then with water. The washed product was dried over anhydrous sodium sulfate and distilled in vacuo in an all glass still. A light yellow color persisted in the distillate and a second distillation in vacuo did not remove the color. The otherwise pure ester was then washed with a 20 per cent aqueous solution of sodium bisulfite. The washed ester was then further washed with a dilute potassium carbonate solution and finally with water. The washed ester was then dried over anhydrous sodium sulfate and then distilled in vacuo. The resulting product was water-white and developed no color upon standing or upon being subjected to polymerization conditions.

In a similar manner, other colored acrylic and α-alkylacrylic acids and their colored derivatives, for example methyl α-methacrylate, methyl acrylate, ethyl acrylate, methyl α-ethacrylate and isopropyl α-methacrylate, can be effectively decolorized when the undesirable coloration results from the oxidation of phenolic polymerization inhibitors.

My process is especially useful for the decolorization of colored monomeric esters of alcohols of the formula $C_nH_{2n+1}OH$ wherein $n$ represents a positive integer of from 1 to 4, and an acid selected from the group consisting of acrylic acid and α-alkylacrylic acids in which the alkyl group contains from 1 to 2 carbon atoms, the color of said monomeric ester being caused by the presence of colored oxidation products of phenolic polymerization inhibitors.

What I claim as my invention and desire to be secured by Letters Patent of the United States is:

1. A process for decolorizing a colored monomeric ester of acrylic acid and esters of α-alkylacrylic acids in which the alkyl group contains from 1 to 2 carbon atoms, the color of said monomeric ester being caused by the presence of colored oxidation products of phenolic polymerization inhibitors and the color not being removable from said monomeric ester by distillation of said monomeric ester, comprising treating the colored ester with an aqueous solution of an alkali metal bisulfite.

2. A process for decolorizing a colored monomeric ester of acrylic acid and esters of α-alkylacrylic acids in which the alkyl group contains from 1 to 2 carbon atoms, the color of said monomeric ester being caused by the presence of colored oxidation products of phenolic polymerization inhibitors and the color not being removable from said monomeric ester by distillation of said monomeric ester, comprising treating the colored ester with an aqueous solution of sodium bisulfite.

3. A process for decolorizing a colored monomeric ester of an alcohol of the formula $C_nH_{2n+1}OH$ wherein $n$ represents a positive integer of from 1 to 4, and an acid selected from the group consisting of acrylic acid and α-alkylacrylic acids in which the alkyl group contains from 1 to 2 carbon atoms, the color of said monomeric ester being caused by the presence of colored oxidation products of phenolic polymerization inhibitors and the color not being removable from said monomeric ester by distillation of said monomeric ester, comprising treating the colored ester with an aqueous solution of an alkali metal bisulfite.

4. A process for decolorizing a colored monomeric ester of an alcohol of the formula $C_nH_{2n+1}OH$ wherein $n$ represents a positive integer of from 1 to 4, and an acid selected from the group consisting of acrylic acid and α-alkylacrylic acids in which the alkyl group contains from 1 to 2 carbon atoms, the color of said monomeric ester being caused by the presence of colored oxidation products of phenolic polymerization inhibitors and the color not being removable from said monomeric ester by distillation of said monomeric ester, comprising treating the colored ester with an aqueous solution of sodium bisulfite.

WILLIAM P. UTERMOHLEN, Jr.

REFERENCES CITED

The following references are of record in the file of this patent:

UNITED STATES PATENTS

| Number | Name | Date |
|---|---|---|
| 1,401,937 | Bailey | Dec. 27, 1921 |
| 2,130,322 | Kharasch | Sept. 13, 1938 |
| 2,255,483 | D'Alelio | Sept. 9, 1941 |
| 2,314,443 | Crawford et al. | Mar. 23, 1943 |
| 2,414,589 | Fein et al. | Jan. 21, 1947 |

OTHER REFERENCES

Smith et al., Industrial & Eng. Chem., vol. 34, pages 474-476 (1942).